(12) United States Patent
Petrescu et al.

(10) Patent No.: US 8,770,065 B2
(45) Date of Patent: Jul. 8, 2014

(54) ROTARY WORKPIECE INDEXING METHOD AND APPARATUS

(75) Inventors: Mircea Petrescu, Windsor (CA); Tom Tourangeau, LaSalle (CA)

(73) Assignee: Colonial Tool Group Inc., Windsor (CA)

( * ) Notice: Subject to any disclaimer, the term of this patent is extended or adjusted under 35 U.S.C. 154(b) by 351 days.

(21) Appl. No.: 12/914,706

(22) Filed: Oct. 28, 2010

(65) Prior Publication Data

US 2011/0100160 A1    May 5, 2011

Related U.S. Application Data

(60) Provisional application No. 61/258,437, filed on Nov. 5, 2009.

(51) Int. Cl.
    *B23B 29/24*    (2006.01)
(52) U.S. Cl.
    USPC ........................................... 74/813 L
(58) Field of Classification Search
    USPC ............................. 74/813 R, 813 L
    See application file for complete search history.

(56) References Cited

U.S. PATENT DOCUMENTS

| | | | |
|---|---|---|---|
| 2,808,741 A | 10/1957 | Bellmann | |
| 3,424,319 A * | 1/1969 | Darash et al. | 198/341.02 |
| 3,518,899 A | 7/1970 | Greenberg | |
| 3,618,427 A * | 11/1971 | Schoepe | 74/824 |
| 3,653,282 A | 4/1972 | Bouffiou et al. | |
| 3,667,305 A | 6/1972 | Rasoira | |
| 3,786,721 A * | 1/1974 | Reda | 409/165 |
| 3,824,877 A | 7/1974 | Mazue | |
| 3,877,322 A | 4/1975 | Benjamin et al. | |
| 3,941,014 A | 3/1976 | Benjamin et al. | |
| 4,080,849 A * | 3/1978 | Benjamin et al. | 74/813 R |
| 4,189,963 A | 2/1980 | Sano et al. | |
| 4,259,627 A | 3/1981 | Matsuno et al. | |
| 4,380,939 A * | 4/1983 | Gardner | 74/813 L |
| 4,463,488 A | 8/1984 | Pieczulewski | |
| 4,558,611 A | 12/1985 | Boffelli | |
| 5,042,322 A * | 8/1991 | Hofmann | 74/640 |
| 5,133,538 A | 7/1992 | Maeda et al. | |
| 6,457,383 B1 | 10/2002 | Kschier | |
| 6,948,720 B1 | 9/2005 | Carlson | |
| 2010/0107813 A1* | 5/2010 | Tatsuda | 74/813 L |
| 2010/0243383 A1* | 9/2010 | Korischem et al. | 188/67 |

* cited by examiner

*Primary Examiner* — Vicky Johnson
(74) *Attorney, Agent, or Firm* — Reising Ethington P.C.

(57) ABSTRACT

A rotary workpiece indexing apparatus including a spindle supported in a housing for rotation about a spindle axis and including a workpiece-mounting surface coaxially disposed at one axial end of the spindle. A spindle lock releasably secures the spindle against rotational motion relative to the housing and includes clamps carried by the housing in circumferentially-spaced locations around the spindle. The clamps are driven to respective clamped positions securing the spindle against rotational motion by clamping the spindle to the housing through the application of clamping forces at respective spaced-apart locations around the spindle.

26 Claims, 8 Drawing Sheets

ROTARY WORKPIECE INDEXING METHOD AND APPARATUS

CROSS-REFERENCE TO RELATED APPLICATION

This application claims priority from provisional Application No. 61/258,437, filed Nov. 5, 2009, and entitled "Rotary Workpiece Indexing Method and Apparatus", which is incorporated herein by reference in its entirety.

STATEMENT REGARDING FEDERALLY SPONSORED RESEARCH OR DEVELOPMENT

Not Applicable

BACKGROUND

1. Technical Field

This invention relates generally to a method and apparatus for rotationally indexing a workpiece for machining operations.

2. Description of the Related Art Including Information Disclosed Under 37 CFR 1.97 and 1.98

It is known to rotationally index a workpiece to advantageously position the workpiece for machining operations to be carried out on the workpiece. It's also known for such rotational indexing to be carried out by an apparatus including a turntable or spindle supported on a housing for rotary indexing. Such an apparatus will typically include some type of turntable locking system that alternately releases and locks the turntable to rotationally index a workpiece carried by the turntable and hold the workpiece in desired indexed positions while a machining operation is carried out on the workpiece.

For example, U.S. Pat. No. 2,808,741 issued 8 Oct. 1957 to Bellmann and U.S. Pat. No. 3,667,305 issued 6 Jun. 1972 to Rasoira disclose rotary workpiece indexing apparatus that each include a turntable carried by a shaft and supported for rotary indexing on a housing, and a motor that's carried by the housing and is drivingly connected to the shaft to drive the shaft and turntable in rotation relative to the housing. The rotary workpiece indexing apparatus of the Bellmann and Rasoira patents also each include a turntable locking system that includes brakes positioned to secure the turntable against rotational motion relative to the housing by applying axially-directed braking force at least three respective locations spaced around the turntable. In each case the brakes each include an axially-oriented bolt whose head is received in a ring channel or keyway formed into and around a lower surface of the turntable, the bolts being spring-loaded to respective engaged positions where undersides of the bolt heads are brought to bear against annular engagement surfaces in the ring channel. Each brake further includes a bolt release linkage that moves the bolt out of its engaged position to release the turntable for rotation. The release linkage of the Bellmann patent is manually operated and the linkage of the Rasoira patent is hydraulically actuated.

U.S. Pat. No. 6,457,383 issued 1 Oct. 2002 to Kschier discloses a rotary workpiece indexing apparatus comprising a turntable supported for rotation on a housing and a turntable locking system that includes a spreader or pressure ring connected to the bolts. In response to the bolts being drawn axially by the linkages, the pressure ring spreads thin-walled ring segments of a ring-shaped brake shoe outward into engagement with inner walls of a concentric ring groove formed in an underside of the turntable.

For each of the above systems, the positioning of the linkages, bolts, and other braking system components beneath and/or within the turntables, and the interfaces between these components and the undersides of the turntables, requires a significant amount of space and reduces considerably the amount of metal and other structural material that could otherwise be included in or carried by the housing and table to provide additional dimensional stability and help support a workpiece against radial, axial, and torsional motion—especially in high-load machining operations such as high-tonnage broaching.

BRIEF SUMMARY OF THE DISCLOSURE

A rotary workpiece indexing apparatus is provided for rotationally indexing a workpiece for machining operations. The apparatus may include a spindle supported on a housing for rotation about a spindle axis and including a workpiece-mounting surface coaxially disposed at one axial end of the spindle. The apparatus may further include a spindle lock configured to releasably secure the spindle against rotational motion relative to the housing. The spindle lock may include three clamps carried by the housing in circumferentially-spaced locations around the spindle and configured to be driven to respective clamped positions securing the spindle against rotational motion by clamping the spindle to the housing through the application of clamping forces at respective spaced-apart locations around the spindle to provide high radial, axial, and torsional accuracy for machining operations performed on a workpiece clamped or otherwise fastened to the workpiece mounting surface.

The apparatus may include a clamping plate comprising an annular engagement surface. The clamping plate may be carried by the housing for axial movement along a clamping stroke between a clamped position with the engagement surface of the clamping plate applying clamping pressure to an annular upper engagement surface of the spindle and an unclamped position releasing clamping pressure from the spindle. The spindle lock clamps may be connected to the clamping plate and configured to clamp the spindle against the housing by applying force through the engagement surface of the clamping plate to the upper engagement surface of the spindle. This arrangement provides equalized, evenly distributed clamp forces around the circumference of the spindle when the spindle is locked in position relative to the housing, limiting distortion of the workpiece mounting surface that would otherwise negatively affect machining operations performed on a workpiece mounted on the surface.

The clamping plate may comprise a workpiece-mounting access hole and the annular engagement surface may surround the workpiece-mounting access hole. The clamping plate may be carried by the housing in a position with the workpiece-mounting access hole aligned coaxially with and providing access to the workpiece-mounting surface of the spindle. The clamping plate may include an annular detent comprising the annular engagement surface and defining the workpiece-mounting surface hole.

The clamps may be configured to apply to the clamping plate, at respective circumferentially spaced-apart points around the workpiece-mounting surface hole, clamping forces oriented to include respective axially directed components. This allows the spindle to be clamped against the housing.

The clamps may include respective axially-oriented bolts that engage the clamping plate and may be configured to apply generally axially-directed clamping forces to the spindle by drawing the clamping plate against the spindle.

The clamp bolts may be positioned to apply clamping forces to the clamping plate at circumferentially equally-spaced locations around the workpiece-mounting surface hole.

Clamps further include respective hydraulic cylinders drivingly connected to the clamp bolts through clamp bolt cam linkages operatively connected between the cylinders and the bolts and configured to move the bolts in a direction applying clamping force to the spindle through the clamping plate.

The clamp bolt cam linkages may be configured to move the bolts in respective directions having axially directed components.

The clamp bolt cam linkages may be configured to use lost motion to provide the same shuttle stroke regardless of the available piston stroke length of cylinders selected to drive clamping and/or unclamping.

The hydraulic cylinder may be carried by the housing and may include a piston supported for generally horizontal reciprocal translational motion along a piston path between an unclamped position releasing the spindle for rotation and a clamped position clamping the spindle to the housing. Each clamp linkage may include a shuttle supported for generally vertical reciprocal translational motion along a shuttle path and may carry one of the clamp bolts, and each clamp linkage may be configured to convert generally horizontally-directed piston forces into generally vertical forces transmitted through the shuttle and clamp bolt.

The clamps may be biased toward their respective clamping positions and are movable toward their respective unclamped positions by hydraulic cylinder actuation.

The clamps may be biased toward their respective unclamped positions and are movable toward and held in their respective clamping positions by hydraulic cylinder actuation.

Each clamp linkage may include an arm pivotally engaged with the piston for relative pivotal motion about a first pivot axis and pivotally engaged with the shuttle for relative pivotal motion about a second pivot axis spaced from the first pivot axis with the linkage in the clamped position, and configured to convert generally horizontal motion of the piston into generally vertical motion of the shuttle and clamp bolt, the angle between the shuttle/clamping plate stroke paths and an imaginary line drawn through the first and second pivot axes is less than 14 degrees with the linkage in the clamped position. The small angle between the piston and shuttle paths provides a high force amplification factor and requiring less hydraulic pressure for a given amount of force application.

The angle between the shuttle/clamping plate stroke path and an imaginary line drawn through the first and second pivot axes may measure approximately 13 degrees with the linkage in the clamped position.

The upper engagement surface of the spindle may be disposed at a radially outermost peripheral circumferential outer edge of the spindle to maximize the clamping force torque arm length for a spindle and/or workpiece mounting surface of a given diameter.

The spindle may include a lower annular engagement surface coaxially aligned with an annular engagement surface of the housing, and the apparatus may include an annular clamp ring disposed between the lower annular engagement surface of the spindle and the engagement surface of the housing to act as a retainer for an outer race of bearings supporting the spindle for rotation on the housing and to provide a wear component that is structurally simple, easily manufacturable, readily available, and is easily removable and replaceable.

The clamping plate may be in sealing contact with a circumferential surface of the spindle to protect interior apparatus components and engagement surfaces from coolant fluid, metal fragments, and other contaminants that might otherwise pass through a gap between an inner circumferential surface of the workpiece-mounting access hole of the clamping plate and an outer circumferential surface of the spindle.

The first o-ring seal may be disposed between the outer circumferential sealing surface of the spindle and an inner circumferential surface of the workpiece-mounting access hole of the clamping plate.

The clamping plate may be in sealing contact with the housing to further protect interior apparatus components and engagement surfaces against contaminants.

Alternatively, a second o-ring seal may be disposed between the clamping plate and the housing to protect interior apparatus components and engagement surfaces from contaminants that might otherwise pass through a gap between a lower surface of the clamping plate and a facing upper surface of the housing.

The clamping stroke may be small enough to fall within the compression range of the o-ring. This allows sealing contact between the clamping plate and the housing to be maintained throughout the clamping stroke precluding the need to synchronize motion at the three locations where the clamps apply clamping force.

The apparatus may include positive stops in respective positions on the housing to engage the spindle lock clamps and positively stop the motion of the clamping plate with the clamping plate at a distance from its clamped position equal to the clamping stroke to insure that sealing contact is maintained with the clamping plate in its unclamped position.

The clamping plate may be biased away from the spindle to release pressure from the upper engagement surface of the spindle and reduce or eliminate interference that would otherwise be caused by friction between the clamping plate and the spindle and/or between the spindle and the housing during rotary indexing of the spindle when the clamps are not applying clamping force. This also eliminates the need to remove metal from the spindle and/or housing to accommodate all the springs that would be necessary to generate sufficient clamping force, and thus allows for additional structural strength and rigidity to be retained in the spindle and/or housing.

The clamping plate may be spring-loaded toward the unclamped position

An indexing motor may be carried by the housing and drivingly connected to the spindle and configured to drive the spindle in indexed rotation relative to the housing.

The spindle may include a radially outwardly extending circumferential spindle flange disposed at a radially outermost peripheral circumferential outer edge of the spindle, and the upper and lower annular engagement surfaces of the spindle may be disposed on respective upper and lower surfaces of the spindle flange.

The flange may be integrally formed with the rest of the spindle as a single unitary piece.

The spindle flange may include a radially outermost circumference of the spindle so that clamping forces can be applied to a portion of the spindle located as far as possible from the spindle axis, maximizing the torque arm and minimizing the amount of clamping force necessary to secure the spindle.

The spindle may have a major diameter of less than 30 cm because the distribution of clamping forces through the clamping plate allows for increased clamping forces without significant workpiece-mounting surface distortion and, therefore, smaller diameter spindles.

The apparatus is configured to develop more than 950 N*m of holding torque between the spindle and the housing to secure the spindle sufficiently to allow for the performance of machining operations such as high-tonnage broaching on a workpiece mounted on the spindle.

The apparatus may include a rotary digital encoder carried by the spindle and configured to measure rotary motion of the spindle relative to the housing to provide high running accuracy in cooperation with the precision machining and hand-fitting of apparatus parts.

Also, a method is provided for rotationally indexing a workpiece for machining operations. According to this method one can rotationally index a workpiece for machining operations by first providing a rotary workpiece indexing apparatus comprising a spindle supported on a housing for rotation about a spindle axis and including a workpiece-mounting surface coaxially disposed at one axial end of the spindle, and a spindle lock configured to releasably secure the spindle against rotational motion relative to the housing, and including at least two clamps carried by the housing in circumferentially-spaced locations around the spindle and configured to secure the spindle against rotational motion by clamping the spindle to the housing through the application of clamping forces at respective spaced-apart locations around the spindle. A workpiece may be supported on the workpiece-mounting surface of the spindle, the spindle and workpiece may then be rotated to a desired position for a machining operation to be performed on the workpiece, the spindle may be clamped to the housing by causing the clamps to apply clamping forces at the respective locations around the spindle, and a machining operation may then be performed on the workpiece.

The step of clamping the spindle to the housing may include applying, at the respective locations around the spindle, clamping forces oriented to include respective axially directed components.

The clamping forces applied at the respective locations around the spindle may be generally axially-oriented clamping forces.

The clamping forces may be applied at a radially outermost circumference of the spindle.

The step of providing a rotary workpiece indexing apparatus may include providing a clamping plate carried by the housing in a position with an annular engagement surface of the clamping plate aligned coaxially opposite an annular upper engagement surface of the spindle, and the step of clamping the spindle to the housing may include applying the clamping forces to the clamping plate and drawing the engagement surface of the clamping plate against the upper engagement surface of the spindle.

The step of providing a rotary workpiece indexing apparatus may include providing an annular clamp ring between a lower annular engagement surface of the spindle and an annular engagement surface of the housing, and the step of clamping the spindle to the housing may include compressing the clamp ring between the lower annular engagement surface of the spindle and the annular engagement surface of the housing.

The step of providing a clamping plate may include biasing the clamping plate away from the spindle, and the step of clamping the spindle to the housing may include applying clamping forces sufficient to overcome the bias.

The step of providing a rotary workpiece indexing apparatus may include providing a clamping plate that's carried by the housing for axial movement along a clamping stroke between a clamped position applying clamping pressure to the spindle, and an unclamped position releasing clamping pressure from the spindle. The spindle lock clamps may be connected to the clamping plate and configured to clamp the spindle against the housing by drawing the clamping plate against the spindle. The clamps may include respective hydraulic cylinders drivingly connected to the clamping plate through clamp bolt cam linkages. Each hydraulic cylinder may be carried by the housing and may include a piston supported for generally horizontal reciprocal translational motion along a piston stroke path. Each clamp linkage may include a shuttle connecting the linkage to the clamping plate. Each clamp linkage may include an arm pivotally engaged with the piston for relative pivotal motion about a first pivot axis and pivotally engaged with the shuttle for relative pivotal motion about a second pivot axis with the linkage in the clamped position, and may be configured to convert generally horizontal piston forces into generally vertical forces transmitted to the clamping plate and spindle through the shuttle along a shuttle stroke path. The amount of clamping force to be applied to the clamping plate and spindle for a given application may be adjusted by adjusting an angle formed between the shuttle stroke path and an imaginary line passing through the first and second pivot axes for each linkage with the linkages in respective clamped positions. That angle may be adjusted by modifying components of the linkage so that the angle will have a value that results in the development of a desired amount of clamping force for the application. This allows the apparatus to be adapted to different applications by modifying linkage components and without having to adjust or replace any other apparatus components.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which.

DETAILED DESCRIPTION OF INVENTION EMBODIMENT(S)

Figure 1:
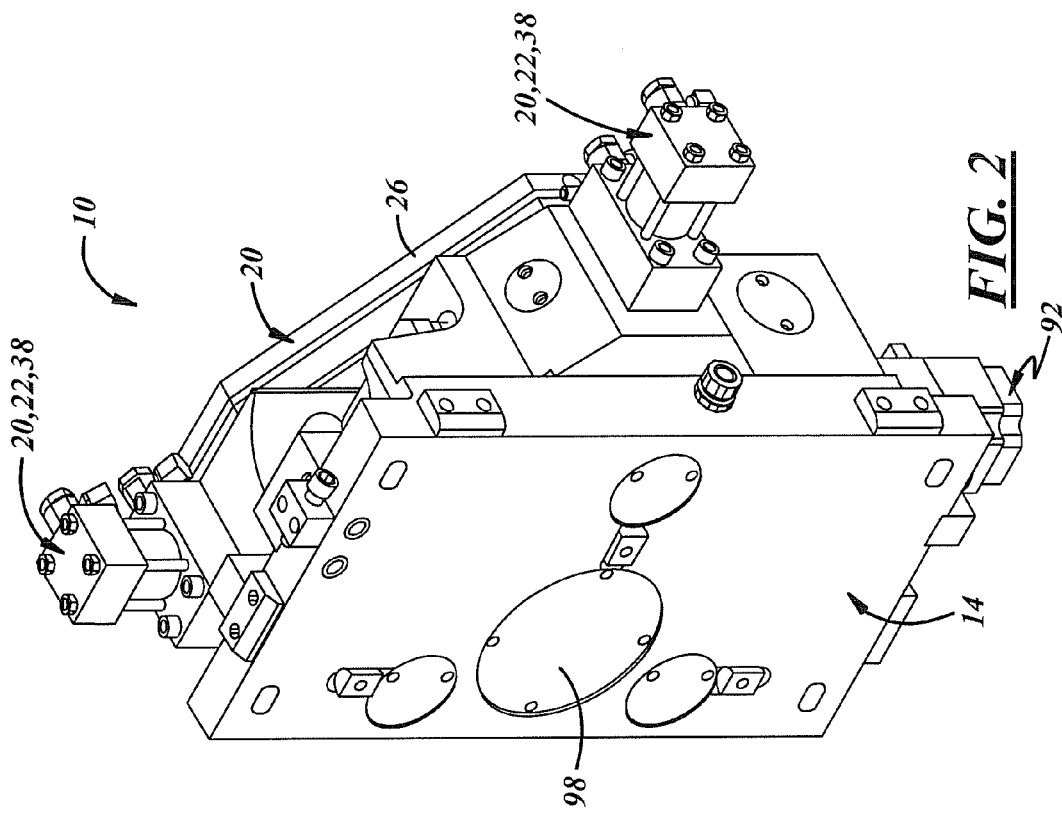
FIG. 1 is a perspective view of a rotary workpiece indexing apparatus.

A rotary workpiece indexing apparatus for rotationally indexing a workpiece for machining operations is generally shown at 10 in FIGS. 1-3 and 20. The apparatus 10 may include a spindle 12 supported on or within a housing 14 for rotation about a spindle axis 16 and including a workpiece-mounting surface 18 coaxially disposed at one axial end of the spindle 12. The apparatus 10 may also include a spindle lock 20 that releasably secures the spindle 12 against radial, axial, and rotational motion relative to the housing 14. The spindle lock 20 may include three clamps 22 carried by the housing 14 in circumferentially-spaced locations around the spindle 12. The clamps 22 may be drivable to respective clamped positions securing the spindle 12 against radial, axial, and rotational motion by clamping the spindle 12 to the housing 14 through the application of clamping forces at respective spaced-apart locations around the spindle 12. This arrangement can provide high radial, axial, and torsional accuracy for machining operations performed on a workpiece (not shown) clamped or otherwise fastened to the workpiece mounting surface 18.

Figure 9:
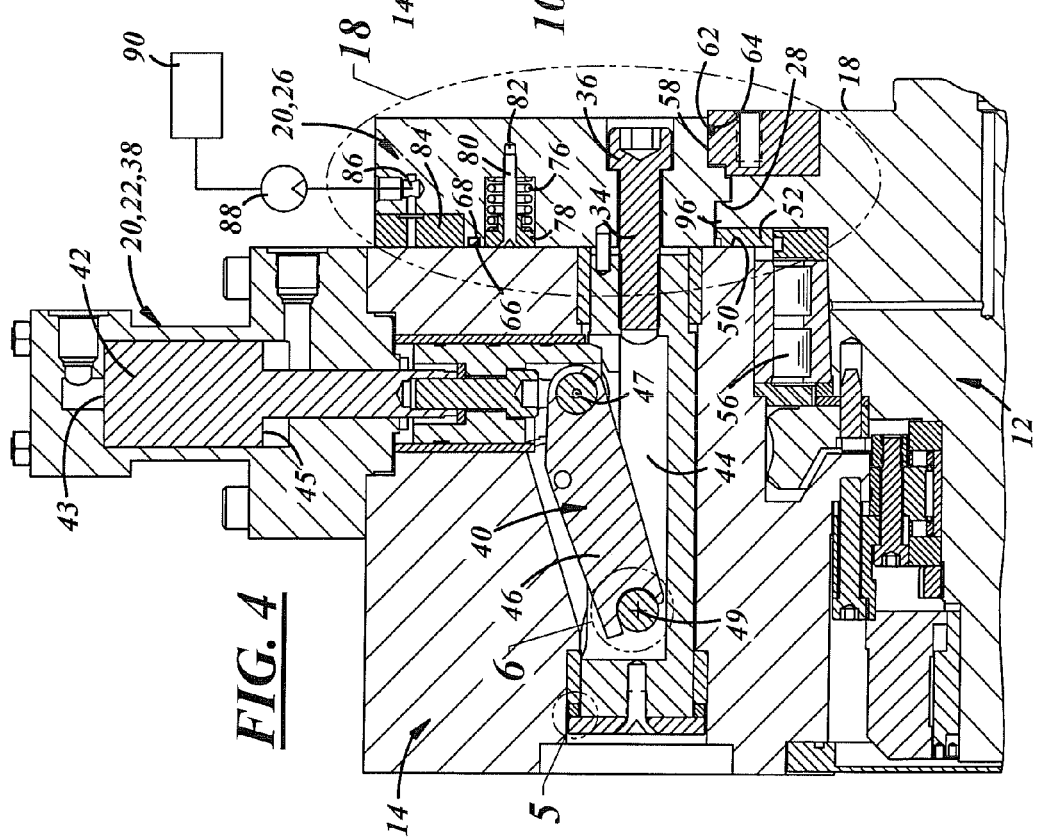
FIG. 9 is a fragmentary cross-sectional view of the apparatus of FIG. 1 with the clamping plate and spindle lock clamp shuttle of the apparatus shown in a clamped position with the clamping plate being held in a clamped position against the spindle, and showing the bolt clamp linkage and piston in their clamped position.
Figure 17:
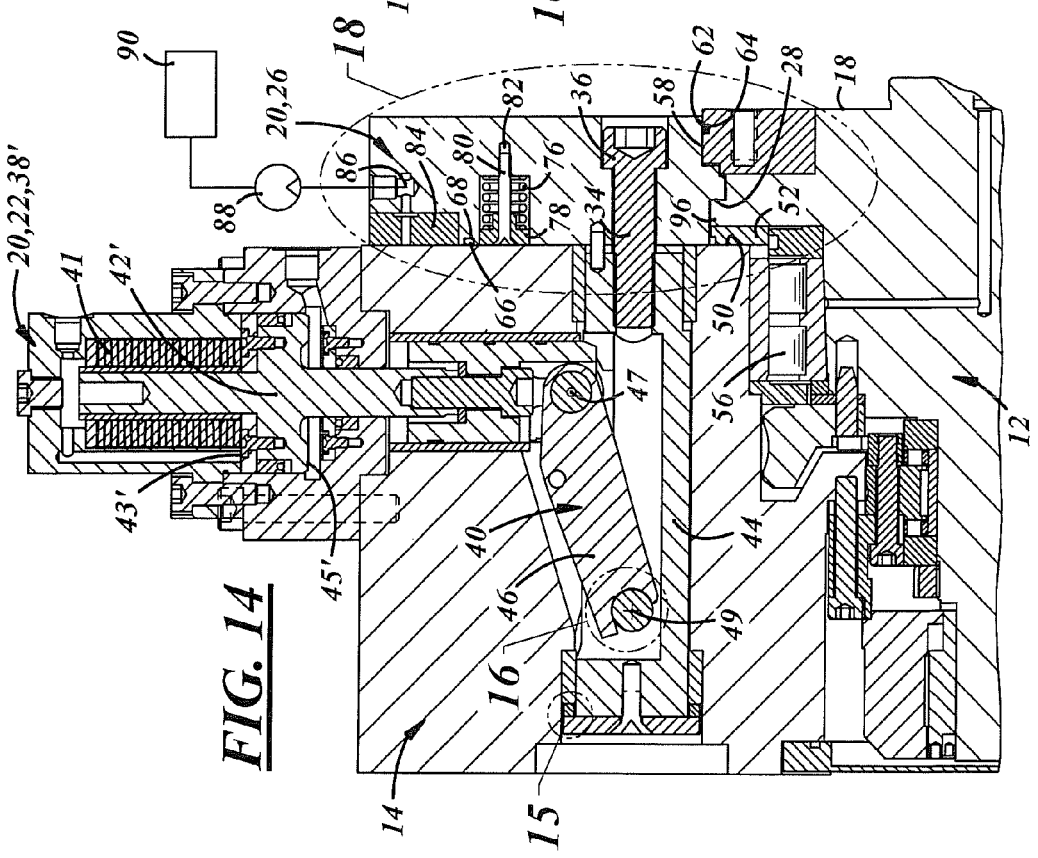
FIG. 17 is a fragmentary cross-sectional view of the apparatus of FIG. 1 with the clamping plate and spindle lock clamp shuttle shown in the clamped position with the clamping plate being held in a clamped position against the spindle, and showing the bolt clamp linkage and the piston of the alternative spring-return cylinder in their clamped position.

The apparatus 10 may include a clamping plate 26 that may comprise an annular engagement surface 28. The clamping plate may be carried by the housing 14 for axial movement along a clamping stroke between a clamped position against an upper engagement surface 30 of the spindle 12 as shown in FIGS. 9 and 17, and an unclamped position shown in FIGS. 4 and 14 in which the annular engagement surface 28 of the clamping plate 26 is aligned coaxially opposite and may be spaced from an annular upper engagement surface 30 of the spindle 12. The spindle lock clamps 22 may be connected to the clamping plate 26 and may be arranged to clamp the spindle 12 against the housing 14 by drawing the annular engagement surface 28 of the clamping plate 26 against the upper engagement surface 30 of the spindle 12 in a way that provides equalized, evenly distributed axially-directed clamp forces around the circumference of the spindle 12 when the spindle 12 is locked in position relative to the housing 14. This arrangement can limit distortion of the workpiece mounting surface 18 that would otherwise negatively affect machining operations performed on a workpiece mounted on that the annular engagement surface 18.

Figure 3:
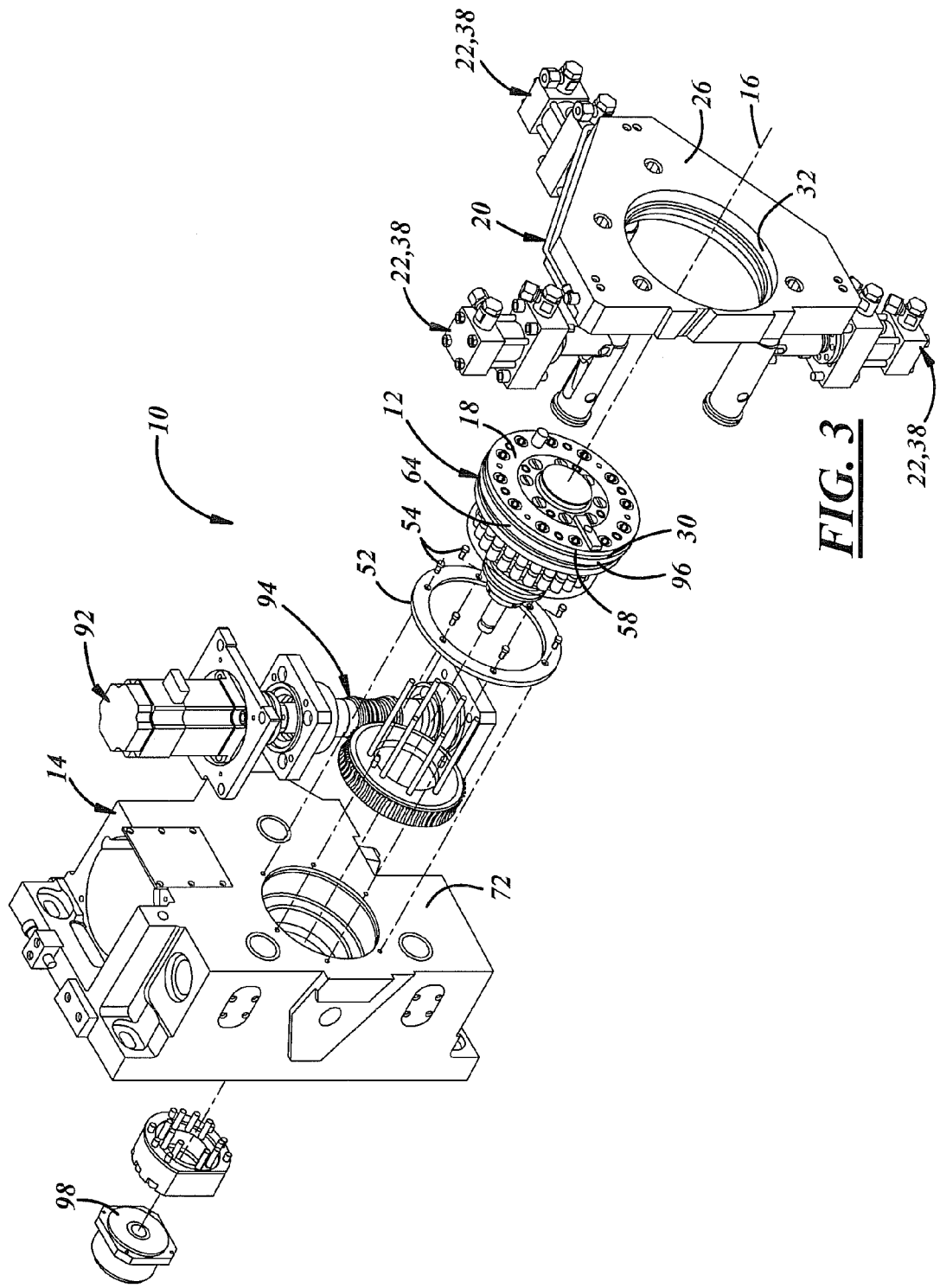
FIG. 3 is an exploded view of the apparatus of FIG. 1.

As best shown in FIG. 3, the clamping plate 26 may comprise a circular workpiece-mounting access hole 32. The annular engagement surface 28 may concentrically surround the workpiece-mounting access hole 32, and the clamping plate 26 may be carried by the housing 14 in a position with the workpiece-mounting access hole 32 aligned coaxially with and providing access to the workpiece-mounting surface 18 of the spindle 12. The clamping plate 26 may include an annular detent 34 comprising the annular engagement surface 28 and at least partially defining the workpiece-mounting surface access hole 32.

Figure 18:
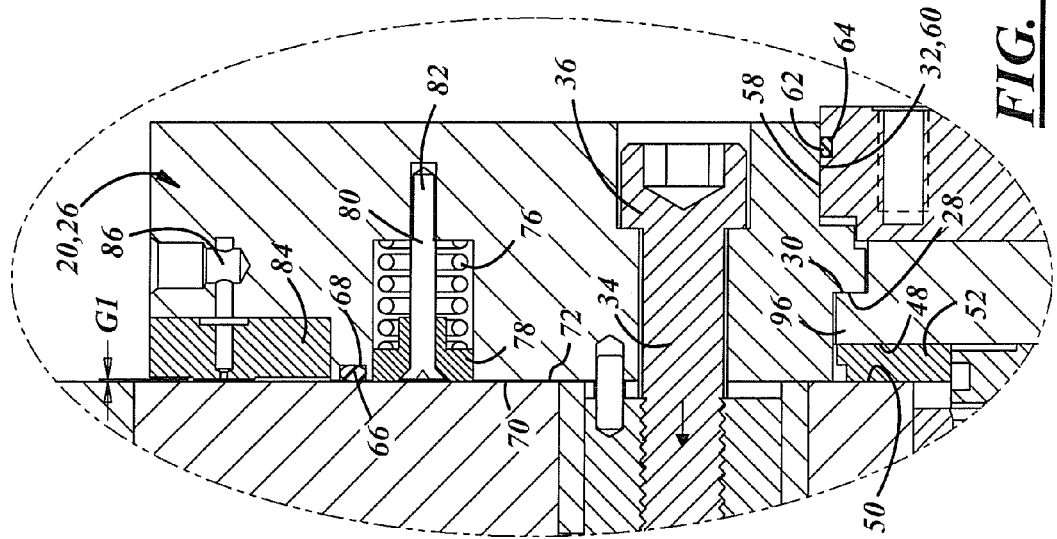
FIG. 18 is a magnified view of the portion of the apparatus that's enclosed by oval 18 in both FIGS. 4 and 14 and showing an air gap between a pressure pad and housing of the apparatus, and compression of a second o-ring seal of the apparatus, with the clamping plate in its unclamped position.
Figure 19:
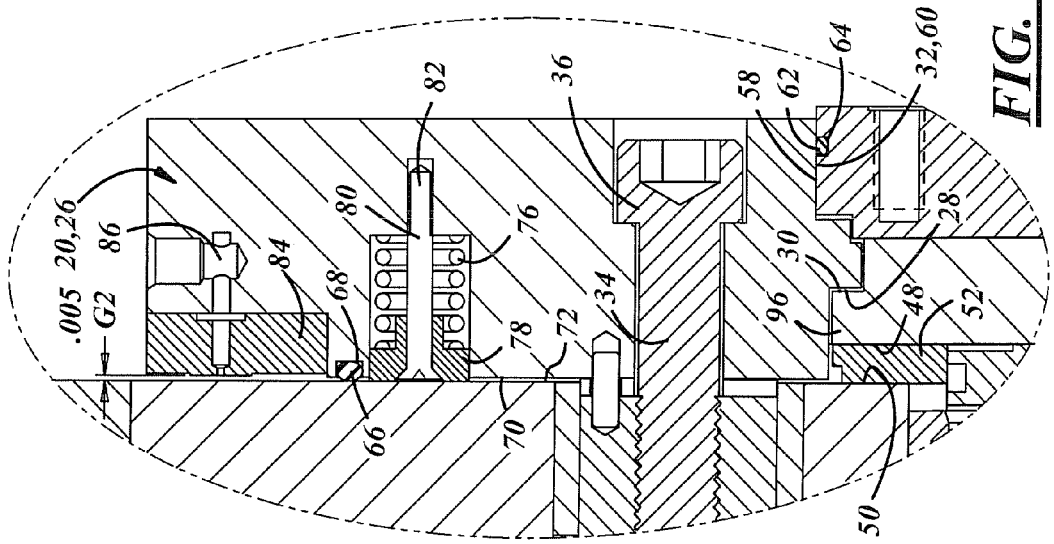
FIG. 19 is a magnified view of the portion of the apparatus that's enclosed by oval 19 in both FIGS. 9 and 17 and showing an air gap between the pressure pad and housing, and compression of a second o-ring seal of the apparatus, with the clamping plate in its clamped position.
Figure 20:
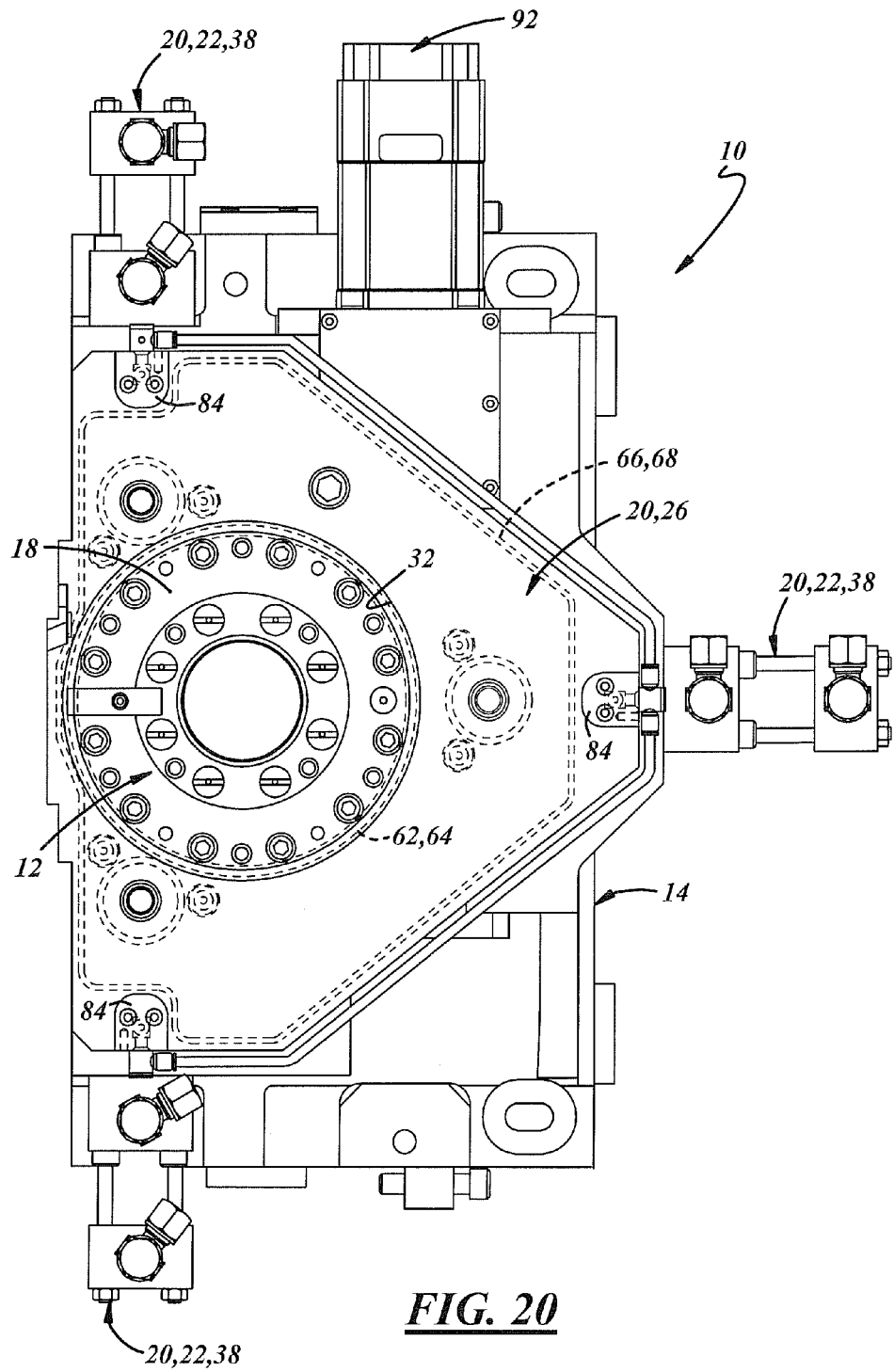
FIG. 20 is a top view of the apparatus of FIG. 1 showing a hidden o-ring seal of the apparatus.

As best shown in FIG. 18, the clamps 22 may be configured to apply clamping forces to the clamping plate 26 at three respective circumferentially spaced-apart points around the workpiece-mounting surface access hole 32. Those clamping forces may be oriented to include respective axially directed components that are applied to clamp the spindle 12 against the housing 14. As shown in FIGS. 4, 9, 14, and 17, the clamps 22 may include respective axially-oriented bolts 34 that may include heads 36 that engage the clamping plate 26 and apply generally axially-directed clamping forces to the spindle 12 by drawing the clamping plate 26 against the spindle 12. The clamp bolts 34 may be positioned to apply clamping forces to the clamping plate 26 at circumferentially equally-spaced locations around the workpiece-mounting surface access hole 32.

Figure 4:
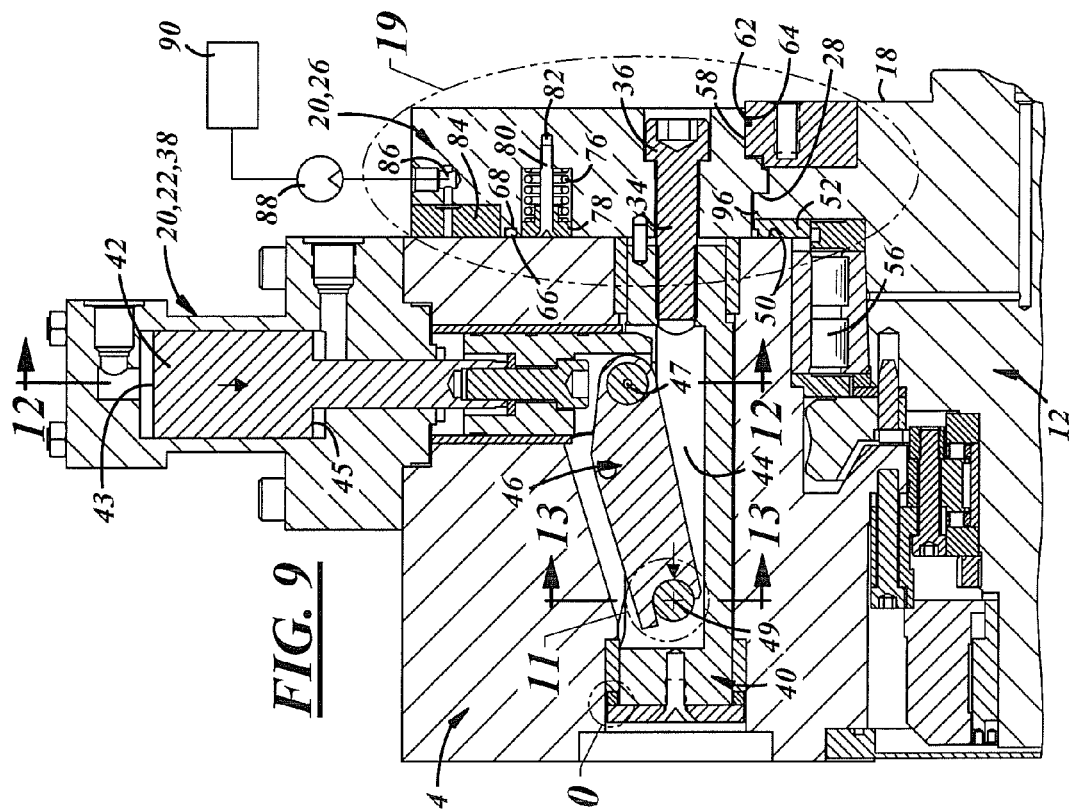
FIG. 4 is a fragmentary cross-sectional view of the apparatus of FIG. 1 with a clamping plate and spindle lock clamp shuttle of the apparatus shown in an unclamped position unclamping a spindle of the apparatus for rotation, and showing a bolt clamp linkage and piston of the apparatus in a fully retracted position.

The clamps 22 may further include respective hydraulic cylinders 38, 38' including respective pistons 42, 42' that may be drivingly connected to the clamp bolts 34 through respective clamp bolt cam linkages 40 that may be operatively connected between the pistons 42 and the clamp bolts 34. As shown in FIGS. 4 and 9, the cylinders 38 may be of a "load-return" type arranged to move the bolts 34 in a direction applying clamping force to the spindle 12 through the clamping plate 26 in response to the application of hydraulic pressure to a first side 43 of each piston 42 opposite its associated clamp bolt cam linkage 40. Clamping force may be removed in response to the removal of pressure from the first side 43 of each piston 42 and the pistons 42 returned to the opposite ends of their respective strokes through application of hydraulic pressure to a second side 45 of each piston 42 connected to its associated clamp bolt cam linkage 40.

Figure 14:
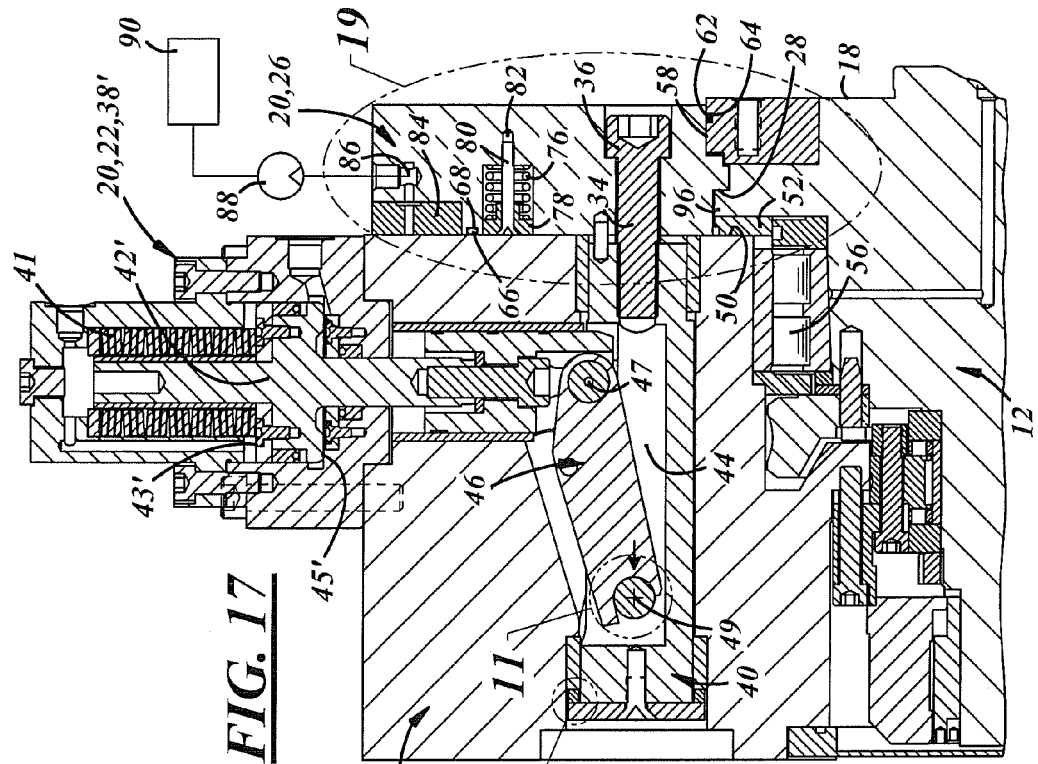
FIG. 14 is a fragmentary cross-sectional view of the apparatus of FIG. 1 with the clamping plate and spindle lock clamp shuttle shown in the unclamped or released position releasing the spindle for rotation, and showing the bolt clamp linkage and the piston of an alternative spring-return cylinder in a fully retracted position.

Alternatively, and as shown in FIGS. 14 and 17, the clamps 22 may include spring-loaded or "spring-return" type hydraulic cylinders 38' that may include internal springs 41 arranged to bias respective pistons 42' of the cylinders 38' by applying spring force to a first side 43' of each piston 42' in a direction applying clamping force to a spindle 12 through the associated clamp bolt cam linkage 40 as shown in FIG. 17. Where spring-return cylinders 38' are used, clamping force may be removed from the spindle 12 in response to the application of hydraulic pressure to a second side 45' of each piston 42' opposite its associated biasing spring 41, moving the pistons 42' to unclamped positions as shown in FIG. 14.

In either case, whether a load-return cylinder 38 or a spring-return cylinder 38' is used, it has been found that, for tables up to 12 inches (30.5 cm) in diameter, the amount of strength, stiffness, and precision that can be provided by the apparatus 10 and the amount of holding torque that can be generated is greater if continuous hydraulic pressure or, alternatively, continuous internal cylinder spring pressure, is used to apply clamping force than if the clamping force were generated, as taught in the prior art, by springs disposed within the limited space that would be available for such spring mechanisms within a turntable or spindle 12 or beneath such a turntable or spindle 12 within a supporting housing 14. Among other things, the space that must be carved-out or left vacant to house springs beneath or within a turntable or spindle 12 would significantly reduce the amount of structural metal supporting a workpiece 24 against movement as a machining operation such as high tonnage broaching is being performed on the workpiece. While any suitable load return or spring return cylinders may be used, in the present embodiment, the load return cylinders 38 are 40JJHMIRL19Mx10M-22-11 cylinders available from Parker, and the spring-return cylinders 38' are custom made by Colonial Tool Group Inc., the assignee of the present invention, in a mounting configuration that allows the custom spring-return cylinders 38' to be interchanged with the Parker cylinders 38'. Also in the present embodiment, each of the custom spring-return cylinders 38' includes a series of 7 sets of three parallel springs arranged to provide a desired clamping force and a desired stroke of 4.40 mm.

The clamp linkages 40 may be configured to move the bolts 34 in respective directions having axially-directed components (vertically-directed in the embodiment shown in the drawings). The hydraulic cylinders 38, 38' may be carried by the housing 14 and their respective pistons 42, 42' may be supported for generally horizontal reciprocal translational motion along respective piston stroke paths. The stroke path of each piston 42, 42' extends between a fully clamped position shown in FIGS. 9 and 17 in which the spindle 12 is clamped to the housing 14 and a fully retracted position shown in FIGS. 4 and 14 in which the spindle 12 is not clamped to the housing 14. The stroke path of each piston 42, 42' may include a piston stroke lost motion portion and a piston stroke working portion. The piston stroke working portion may extend between an intermediate "release" position and the fully clamped position, and is the portion of the piston stroke during which the clamp bolts 34 and clamping plate 26 are actually moving through their shuttle/clamping plate stroke. The piston stroke lost motion portion may extend between the fully retracted position and an intermediate "release" position, and is the portion of the piston stroke during which the clamp bolts 34 and clamping plate 26 are not moving. Motion of the pistons 42 from their respective fully retracted positions to their respective fully clamped positions, over both the working and lost motion portions of their respective strokes, is in response to either the application of hydraulic pressure, where a load-return hydraulic cylinder 38 is used, or in response to spring bias where a spring-return hydraulic cylinder 38' is used.

The clamps 22 may be configured to move the pistons of the load-return cylinders 38 and the spring-return cylinders 38' through "operational" piston strokes that are less than their full available piston strokes, but greater than the respective working piston stroke portions. In the present embodiments, where the clamps 22 include load-return cylinders 38 as shown in FIGS. 4 and 9, the full available piston stroke of each load-return cylinder is 10.00 mm (0.394"), the operational piston stroke portion of that full available piston stroke is 5.00 mm (0.197"), and the working piston stroke portion of the operational piston stroke is 0.454 mm (0.018"). Where the clamps 22 include spring-return cylinders 38' as shown in FIGS. 14 and 17, the full available piston stroke of each spring-return cylinder is 4.40 mm (0.173"), the operational piston stroke portion is 2.18 mm (0.086"), and the working piston stroke portion is 0.545 mm (0.022").

As shown in FIGS. 4-16, each clamp linkage 40 may include a spindle lock clamp shuttle 44 supported for generally vertical reciprocal translational motion along a shuttle stroke path and connected to the clamping plate 26 by one of the clamp bolts 34. Each clamp linkage 40 may be configured to produce a stroke length ratio of greater than 1:0.03 between the operational piston stroke length and the shuttle/clamping plate stroke where load-return cylinders 38 are used, and a stroke length ratio of greater than 1:0.06 where spring-return cylinders are used. In the present embodiment, where load-return cylinders 38 are used, a ratio of 1:0.0254 is produced with an operational piston stroke working length of 5.00 mm (0.197") and a shuttle/clamping plate stroke length of 0.127 mm (0.005").

Figure 5:
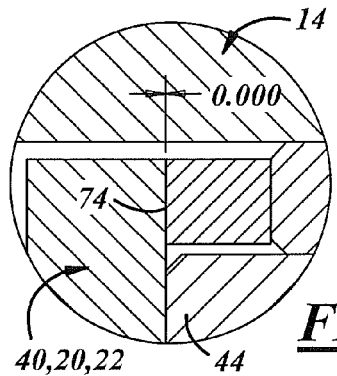
FIG. 5 is a magnified view of a portion of the apparatus enclosed by circle 5 in FIG. 4 and showing a spindle lock clamp shuttle of the apparatus contacting a positive stop of the apparatus while the bolt clamp linkage and piston are in their fully retracted position and the clamping plate and spindle lock clamp shuttle are in their unclamped position.
Figure 10:
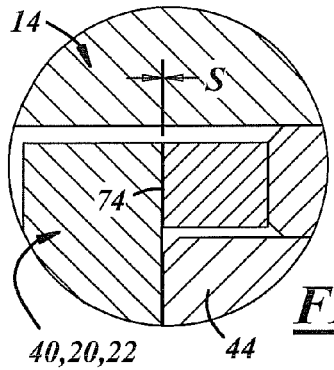
FIG. 10 is a magnified view of a portion of the apparatus enclosed by circle 10 in both FIGS. 9 and 17, showing the spindle lock clamp shuttle spaced from the positive stop while the bolt clamp linkage, piston, clamping plate, and spindle lock clamp shuttle are in their clamped positions.
Figure 11:
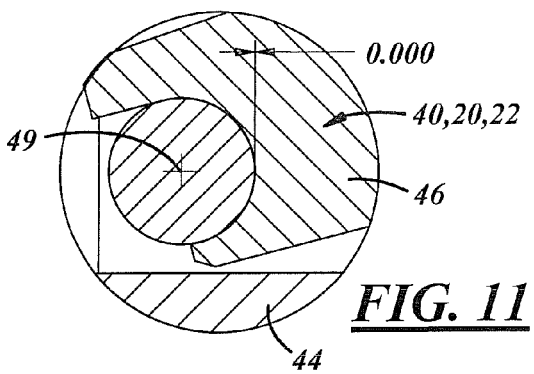
FIG. 11 is a magnified view of a portion of the apparatus enclosed by circle 11 in both FIGS. 9 and 17, showing the arm of the bolt clamp linkage engaged with the spindle lock clamp shuttle while the bolt clamp linkage, piston, clamping plate, and spindle lock clamp shuttle are in their clamped positions.
Figure 15:
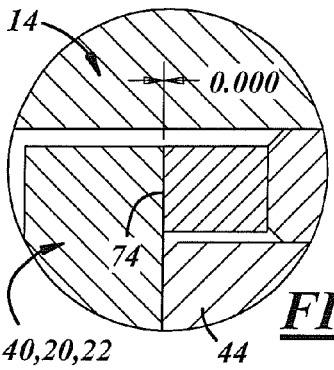
FIG. 15 is a magnified view of a portion of the apparatus enclosed by circle 15 in FIG. 14 showing the spindle lock clamp shuttle contacting the positive stop of the apparatus while the bolt clamp linkage and the piston of the alternative spring-return cylinder are in their fully retracted position and the clamping plate and spindle lock clamp shuttle are in their unclamped position.

As best shown in FIGS. 4, 9, 14, and 17, each clamp linkage 40 may include an arm 46 pivotally engaged adjacent one end with its associated piston 42, 42' for relative pivotal motion about a first pivot axis 47 and pivotally engaged adjacent a second end with the shuttle 44 for relative pivotal motion about a second pivot axis 49 spaced from the first pivot axis 47, and may be arranged in such a way as to convert generally horizontal motion of the piston 42, 42' into generally vertical translational motion of the shuttle 44 and clamp bolt 34 and/or to convert generally horizontal piston forces into generally vertical forces transmitted to the clamping plate 26 and spindle 12 through the shuttle 44 and clamp bolt 34. The angle between the arm 46 (an imaginary line drawn between pivot axes at each end of the arm 46) and the shuttle stroke path for each linkage 40 may be less than 14 degrees with the linkages 40 in respective clamped positions. In the present embodiment the angle between the arm 46 and shuttle stroke path for each linkage 40 is 13.05 degrees with the linkages 40 in respective clamped positions as shown in FIGS. 5 and 10 and is 16.34 degrees with the linkages 40 in respective release positions. The small angle between each of the linkage arms 46 and the stroke path of its associated shuttle provides a high force amplification factor and reduces the amount of hydraulic or spring pressure required for a given amount of clamping force application. The amount of clamping force to be applied to the spindle 12 may be controlled by varying the force amplification factor, which may be accomplished by varying the angle between the linkage arm 46 and the stroke path for each linkage 40 with the linkages 40 in respective clamped positions. This angle may be varied by any suitable means to include modification of linkage component dimensions. This allows the apparatus 10 to be optimized to provide greater clamping forces generally required to arrest and secure spindles 12 of different diameters and/or possessing different moments of inertia. For spindles 12 of lesser diameter and/or moment of inertia, linkage component dimensions may be adjusted to provide a smaller angle between the linkage arm 46 and the stroke path for each linkage 40 with the linkages 40 in respective clamped positions. For spindles 12 of greater diameter and/or moment of inertia, linkage component dimensions may be adjusted to provide a larger angle between the linkage arm 46 and the stroke path for each linkage 40 with the linkages 40 in respective clamped positions.

Figure 6:
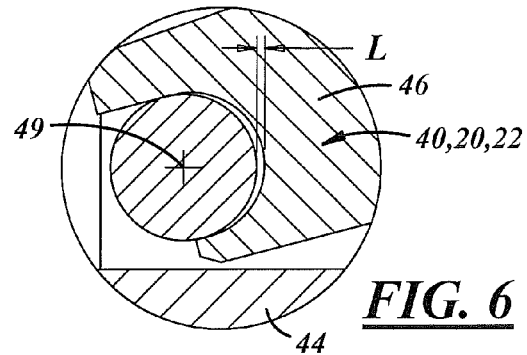
FIG. 6 is a magnified view of a portion of the apparatus enclosed by circle 6 in FIG. 4 and showing an arm of the bolt clamp linkage disengaged from the spindle lock clamp shuttle while the bolt clamp linkage and piston are in their fully retracted position and the clamping plate and spindle lock clamp shuttle are in their unclamped position.
Figure 7:
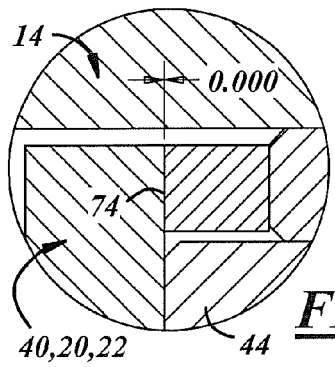
FIG. 7 is a magnified view of the same portion of the apparatus shown enclosed by circle 5 in FIG. 4, but showing that the spindle lock clamp shuttle remains contacting the positive stop while the bolt clamp linkage and piston are in their intermediate "release" position and the clamping plate and spindle lock clamp shuttle remain in their unclamped position.
Figure 8:
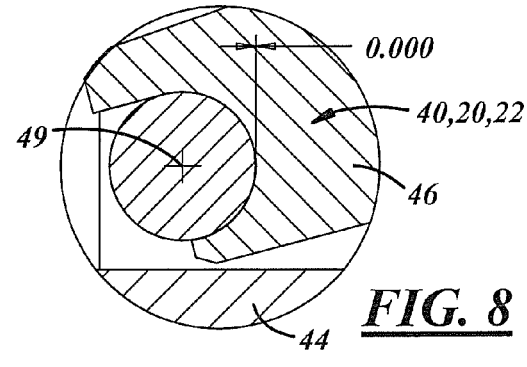
FIG. 8 is a magnified view of the same portion of the apparatus as shown enclosed by circle 6 in FIG. 4, but showing that the arm of the bolt clamp linkage is engaged with the spindle lock clamp shuttle while the bolt clamp linkage and piston are in their intermediate "release" position and the clamping plate and spindle lock clamp shuttle remain in their unclamped position.
Figure 16:
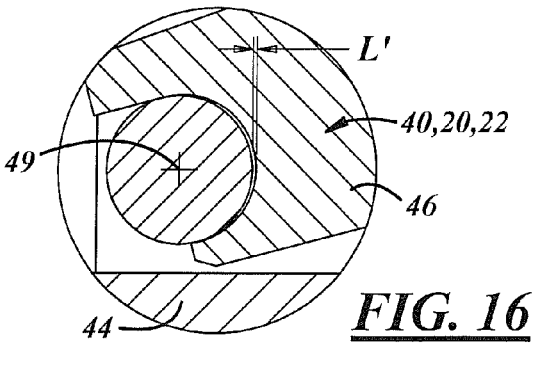
FIG. 16 is a magnified view of another portion of the apparatus enclosed by circle 16 in FIG. 14 showing the bolt clamp linkage arm disengaged from the spindle lock clamp shuttle while the bolt clamp linkage and the piston of the alternative spring-return cylinder are in their fully retracted position and the clamping plate and spindle lock clamp shuttle are in their unclamped position.
Figure 12:
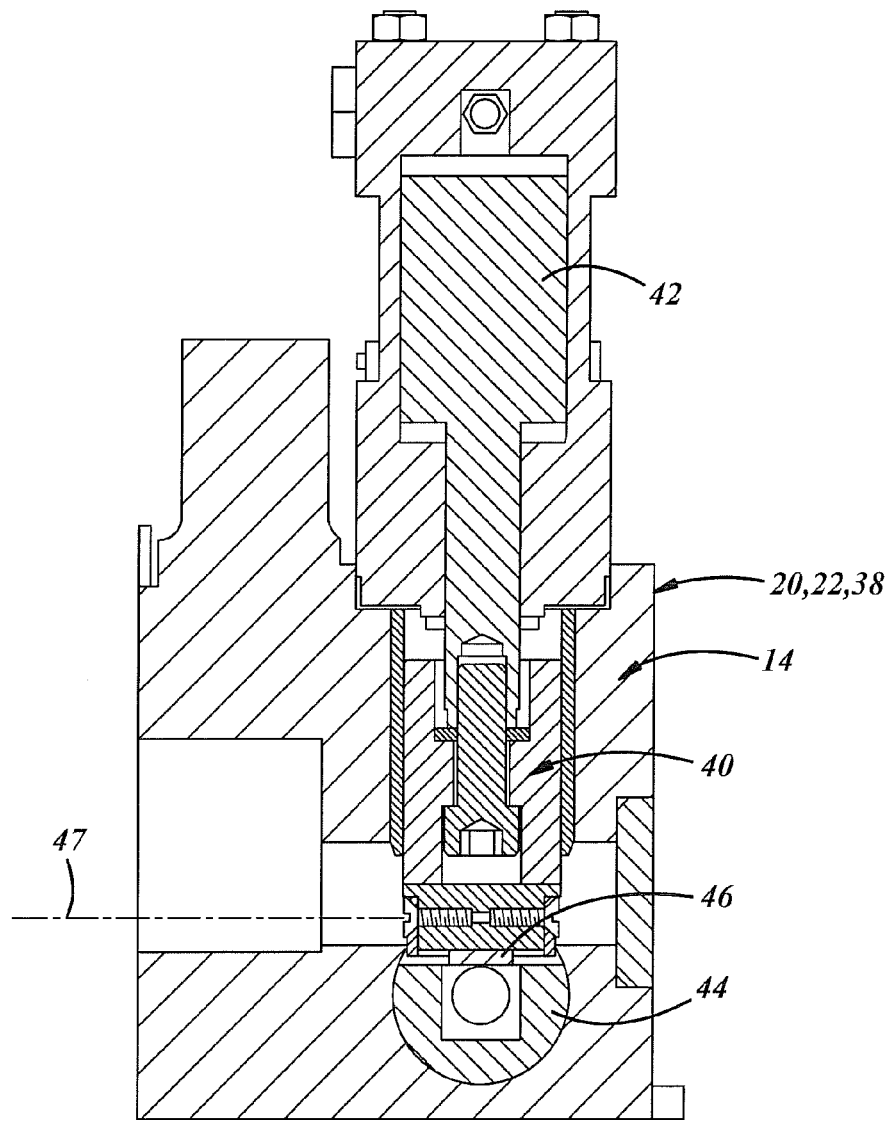
FIG. 12 is a fragmentary cross-sectional view of the apparatus of FIG. 1 taken along line 12-12 in FIG. 9 and showing a clamp of the spindle lock of the apparatus.
Figure 13:
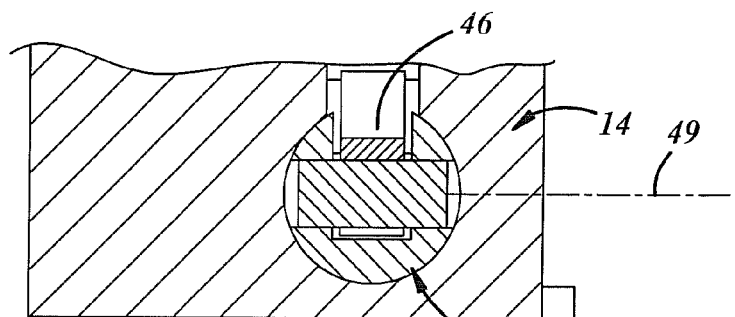
FIG. 13 is a fragmentary cross-sectional view of the apparatus of FIG. 1 taken along line 13-13 in FIG. 9 and showing the clamp.

The clamp linkages 40 may be configured to use lost motion to provide the same shuttle stroke regardless of the available piston stroke length of cylinders selected to drive clamping and/or unclamping. In the present embodiments, and as is best shown in FIG. 10, a shuttle stroke S of 0.127 mm (0.005") is provided whether load return cylinders 38 or spring-return cylinders 38' are used. Accordingly, each load-return cylinder 38 produces 01.27 mm (0.050") of lost motion L between the clamp linkage arm 46 and the shuttle 44 as best shown in FIGS. 4 and 6; and each spring-return cylinder 38' produces 0.381 mm (0.015") of lost motion L' between the clamp linkage arm 46 and the shuttle 44 as best shown in FIGS. 14 and 16. This arrangement allows either the load return cylinders 38 or the spring-return cylinders 38' to be used without having to adjust or modify the clamp linkage 40. It also allows for the use of other cylinders having differing available piston stroke lengths. Where spring-return cylinders 38' are used, it also allows the cylinders 38' to be mounted such that the working portion of each piston's stroke falls within a portion of the total available piston stroke where the range of spring rates allow the limited available hydraulic pressure to move the piston against the spring bias through the entire working portion of its stroke.

The upper engagement surface 30 of the spindle 12 may be disposed at a radially outermost peripheral circumferential edge of the spindle 12. As shown in FIGS. 4, 9, 14, and 17, the spindle 12 may also include a lower annular engagement surface 48 that may be coaxially aligned with an annular engagement surface 50 of the housing 14. An annular alloy steel clamp ring 52 may be disposed between the lower annular engagement surface 48 of the spindle 12 and the annular engagement surface 50 of the housing 14, providing a wear component that is structurally simple, easily manufacturable, readily available, and is easily removable and replaceable. The clamp ring 52 may be fixed to the housing 14 with screws 54 and may be arranged and positioned to act as a retainer for an outer race of bearings 56 supporting the spindle 12 for rotation on the housing 14.

As best shown in FIGS. 4, 9, 14, and 17, the clamping plate 26 may be in sealing contact with an outer circumferential surface 58 of the spindle 12 and arranged to protect interior components and engagement surfaces of the apparatus 10 from coolant fluid, metal fragments, and other contaminants that might otherwise pass through a gap between an inner circumferential surface 60 of the workpiece-mounting access hole 32 of the clamping plate 26 and the outer circumferential surface 58 of the spindle 12. A first o-ring seal 62 may be disposed between the outer circumferential surface 58 of the spindle 12 and the inner circumferential surface 60 of the workpiece-mounting access hole 32 of the clamping plate 26. The first o-ring seal 62 may be carried in a groove 64 formed in and around the outer circumferential surface 58 of the spindle 12.

The clamping plate 26 may also be in sealing contact with the housing 14 to further protect interior components and engagement surfaces of the apparatus 10 against contaminants. A second o-ring seal 66 may be disposed and compressed between the clamping plate 26 and the housing 14 and may be carried in a groove 68 formed in a lower surface 70 of the clamping plate 26 facing an upper surface 72 of the housing 14 as is best shown in FIGS. 4, 9, 14, and 17. The clamping stroke may be small enough, e.g., 0.127 mm (0.005") in the present embodiment, to fall within a compression distance range of the second o-ring seal 66. This allows sealing contact between the clamping plate 26 and the housing 14 to be maintained throughout the clamping stroke, precluding the need to synchronize motion at the three locations where the clamps 22 apply clamping force.

As best shown in FIGS. 5, 7, 10, and 15, the apparatus 10 may include positive stops 74 in respective positions on the housing 14 to engage the spindle lock clamp shuttles 44 and positively stop the motion of the shuttles and clamping plate 26 when, as shown in FIGS. 4 and 14, the clamping plate 26 reaches its unclamped and fully retracted position at a distance from its clamped position equal to the clamping stroke. This arrangement limits the stroke of the clamping plate 26 sufficiently to insure that sealing contact is maintained between the clamping plate 26 and the housing 14 even with the clamping plate 26 in its unclamped, fully retracted position.

The clamping plate 26 may be biased away from the spindle 12 to release pressure from the upper engagement surface 30 of the spindle 12 and reduce or eliminate interference that would otherwise be caused by friction between the clamping plate 26 and the spindle 12 and/or between the spindle 12 and the housing 14 during rotary indexing of the spindle 12 when the clamps 22 are not applying clamping force. The bias may be provided by spring-loading the clamping plate 26 toward the unclamped position as shown in FIGS. 4, 9, 14, and 17. The biasing spring load may be provided by coil springs 76 housed in respective generally cylindrical receptacles 78 formed upward into a lower surface of the clamping plate 26. The springs 76 may be disposed coaxially around respective clamping plate guide posts 80 that extend integrally axially upward from an upper surface of the housing 14 and may be slidably received in guide post receiving holes 82 formed coaxially in upper ends of the respective spring receptacles 78.

The apparatus 10 also may include pressure pads 84 that may be carried in circumferentially spaced locations by the clamping plate 26 in positions to travel with the clamping plate 26 and form respective air gaps G1, G2 with the housing 14 that range between 0.001" (G1) and 0.006" (G2) in respective clamped and fully retracted positions of the clamping plate 26 as shown in FIGS. 4 and 14 (unclamped) and FIGS.

9 and 17 (clamped). In the present embodiment the apparatus 10 includes three such pads 84. Each pressure pad 84 may include an air passage 86 that directs a flow of air from an air source into the gap. Pressure gauges 88 may be configured to send corresponding signals to a controller 90 programmed to calculate and monitor the uniformity of clamping plate position, i.e., parallelism, relative to the facing upper surface of the housing 14 in response to air pressure readings sensed by the gauges 88 at each of the three locations.

As shown in FIGS. 1-3 and 20, an indexing motor 92 may be carried by the housing 14, may be drivingly connected to the spindle 12, and configured to drive the spindle 12 in indexed rotation relative to the housing 14. In the present embodiment such an indexing motor 92 is connected to the spindle 12 through a custom-made zero-backlash worm-gear set 94 available from Textron Cone-Drive.

The spindle 12 may include a radially outwardly extending circumferential spindle flange 96 that may be disposed at a radially outermost peripheral circumferential edge of the spindle 12. The upper and lower annular engagement surfaces 30, 48 of the spindle 12 may be disposed on respective upper and lower surfaces of the spindle flange 96 and the spindle flange 96 may be integrally formed with the rest of the spindle 12 as a single unitary piece. The spindle flange 96 may include a radially outermost circumference of the spindle 12 such that clamping forces can be applied to a portion of the spindle 12 located as far as possible from the spindle axis 16, maximizing the torque arm and minimizing the amount of clamping force necessary to secure the spindle 12.

The spindle 12 may have a major diameter of less than 30.5 cm (12 inches). In at least one embodiment the major diameter of the spindle 12 is 21.60 cm (8.500 inches) and in at least one other embodiment the major diameter of the spindle 12 is only 13.5 cm (5.313 inches). It's possible to use spindles of such small diameter because the clamping plate 26 distributes clamping force application sufficiently to allow very large clamping forces to be applied to the spindle 12 without causing significant distortion to the workpiece-mounting surface 18 of the spindle 12. The apparatus 10 may be configured to develop more than 950 N*m of holding torque between the spindle 12 and the housing 14—enough to secure the spindle 12 against up to 17 tons being applied to a workpiece mounted on the spindle 12. 1355 N*m of holding torque has been demonstrated for embodiments including a 13.5 cm (5.31 inch) diameter spindle 12 with 1688 N*m of holding torque having been calculated as being achievable by an apparatus 10 constructed according to the invention and having a 13.5 cm spindle 12.

The limiting factor driving an increase in the major diameter of a spindle 12 therefore becomes the desired area of the workpiece-mounting surface 18 rather than the length required for the torque arm for clamping force application. This allows a designer the freedom to minimize the diameter of the spindle 12.

Figure 2:
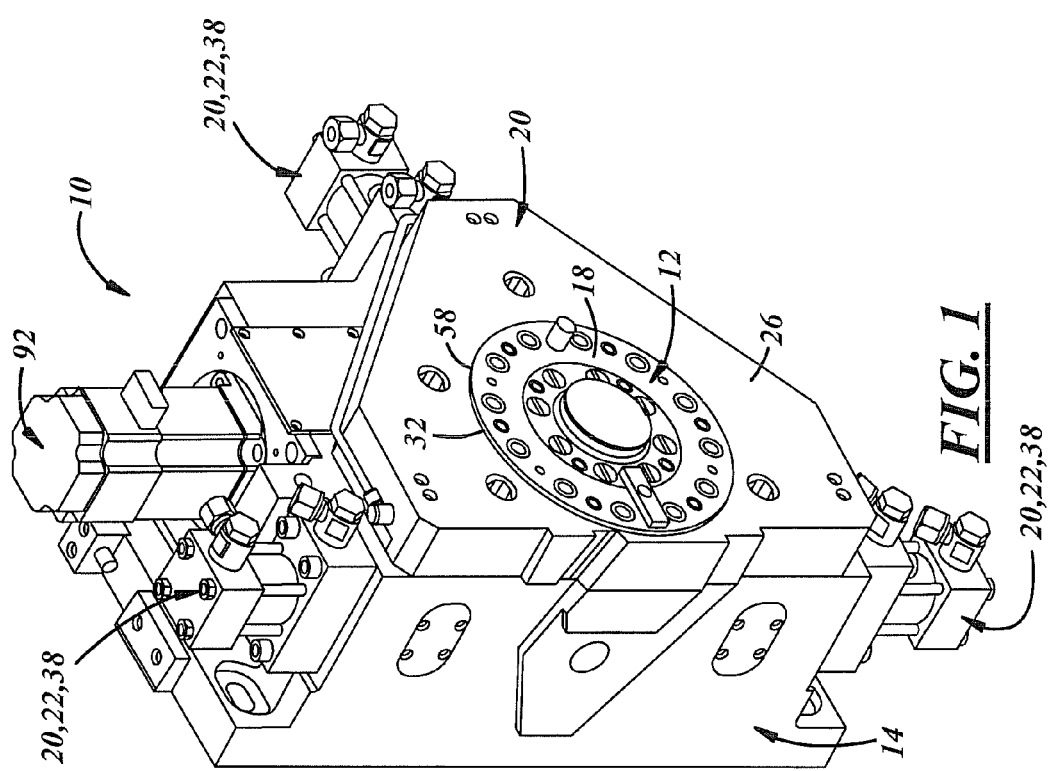
FIG. 2 is another perspective view of the apparatus of FIG. 1.

The apparatus 10 may include a rotary digital encoder 98 that may be carried by a lower axial end of the spindle 12 as shown in FIGS. 2 and 3, may be enclosed within the housing 14, and may be capable of measuring rotary motion of the spindle 12 relative to the housing 14. The encoder 98 may be of any suitable type and may have a measurement accuracy of 360,000 increments per revolution to provide high running accuracy in cooperation with the precision machining and hand-fitting of component parts of the apparatus 10. In the present embodiment the encoder is a model RCN223 available from Heidenhain Corporation of Schaumburg, Ill., and having a system accuracy of +/−5" (arcsec) or +/−2.5" (arcsec).

In practice, a workpiece may be rotationally indexed for machining operations by first providing a rotary workpiece indexing apparatus 10 comprising a spindle 12 supported on a housing 14 for rotation about a spindle axis 16 and including a workpiece-mounting surface 18 coaxially disposed at one axial end of the spindle 12, and a spindle lock 20 configured to releasably secure the spindle 12 against radial, axial, and rotational motion relative to the housing 14, the spindle lock 20 including three clamps 22 carried by the housing 14 in circumferentially-spaced locations around the spindle 12 and configured to be driven to respective clamped positions securing the spindle 12 against radial, axial, and rotational motion by clamping the spindle 12 to the housing 14 through the application of clamping forces at respective spaced-apart locations around the spindle 12. A workpiece may then be supported on the workpiece-mounting surface 18 of the spindle 12 according to any one of a number of suitable workpiece mounting methods known in the art, to include bolting or clamping the workpiece to the mounting surface 18. The spindle 12 and workpiece may then be indexed or rotated to a desired position for a machining operation to be performed on the workpiece. The spindle 12 may then be clamped to the housing 14 by driving the clamps 22 or allowing the clamps 22 to be driven to their respective clamped positions applying clamping forces at the respective locations around the spindle 12. A machining operation may then be performed on the workpiece.

The clamping forces applied at the respective locations around the spindle 12 may be oriented generally axially or may be oriented other than axially while including respective axially directed components. These clamping forces may be applied at a radially outermost circumference of the spindle 12.

The rotary workpiece indexing apparatus 10 may be provided to include a clamping plate 26 carried by the housing 14 in a position with an annular engagement surface 28 of the clamping plate 26 aligned coaxially opposite an annular upper engagement surface 30 of the spindle 12. When such a clamping plate 26 is provided the step of clamping the spindle 12 to the housing 14 may include applying the clamping forces or allowing the clamping forces to be applied to the clamping plate 26 and drawing the engagement surface of the clamping plate 26 against the upper engagement surface 30 of the spindle 12.

The indexing apparatus 10 may also be provided in a configuration in which the clamping plate 26 is biased away from the spindle 12. In this case, the clamping of the spindle 12 to the housing 14 may include applying clamping forces or allowing clamping forces to be applied sufficient to overcome the bias.

The rotary workpiece indexing apparatus 10 may be provided to include an annular clamp ring 52 between the lower annular engagement surface 48 of the spindle 12 and the annular engagement surface 50 of the housing 14. When such a clamp ring 52 is provided with the apparatus 10, the step of clamping the spindle 12 to the housing 14 may include compressing the clamp ring 52 between the lower annular engagement surface 48 of the spindle 12 and the annular engagement surface 50 of the housing 14.

A rotary workpiece indexing apparatus 10 constructed according to the invention is better able to secure a turntable or spindle 12 against rotation by clamping the spindle 12 against the housing 14 with axially-directed clamping force, by distributing turntable locking forces around the circumference of the turntable, and by applying turntable locking forces at an extreme radially outer edge of a turntable. The freedom to minimize diametrical spindle size allows for minimization of floor space requirements and allows machining tools to be located and arranged in closer proximity to the rotational axis and to a workpiece mounted on the spindle 12, and also contributes to rotational positioning accuracy by reducing the moment of inertia of the spindle 12.

This description, rather than describing limitations of an invention, only illustrates embodiments of the invention recited in the claims. The language of this description is therefore exclusively descriptive and is non-limiting.

Obviously, it's possible to modify this invention from what the description teaches. Within the scope of the claims, one may practice the invention other than as described above.

What is claimed is:

1. A rotary workpiece indexing apparatus for rotationally indexing a workpiece for machining operations, the apparatus comprising:
    a spindle supported on a housing for rotation about a spindle axis and including a workpiece-mounting surface coaxially disposed at one axial end of the spindle;
    a spindle lock configured to releasably secure the spindle against rotational motion relative to the housing, the spindle lock including clamps carried by the housing in circumferentially-spaced locations around the spindle and configured to be driven to respective clamped positions securing the spindle against rotational motion by clamping the spindle to the housing through the application of clamping forces at respective spaced-apart locations around the spindle;
    a clamping plate comprising an annular engagement surface, the clamping plate being carried by the housing for axial movement along a clamping stroke between a clamped position with the engagement surface of the clamping plate applying clamping pressure to an annular upper engagement surface of the spindle and an unclamped position releasing clamping pressure from the spindle, the spindle lock clamps being connected to the clamping plate and configured to clamp the spindle against the housing by applying force through the engagement surface of the clamping plate to the upper engagement surface of the spindle;
    axially-oriented clamp bolts that engage the clamping plate and are configured to apply generally axially-directed clamping forces to the spindle by drawing the clamping plate against the spindle, the clamp bolts being positioned to apply clamping forces to the clamping plate at circumferentially spaced locations; and
    hydraulic cylinders drivingly connected to respective ones of the clamp bolts through clamp bolt cam linkages operatively connected between the cylinders and the bolts and configured to move the bolts in a direction applying clamping force to the spindle through the clamping plate.

2. A rotary workpiece indexing apparatus as defined in claim 1 in which:
    the clamping plate comprises a workpiece-mounting access hole;
    the annular engagement surface surrounds the workpiece-mounting access hole; and
    the clamping plate is carried by the housing in a position with the workpiece-mounting access hole aligned coaxially with and providing access to the workpiece-mounting surface of the spindle.

3. A rotary workpiece indexing apparatus as defined in claim 2 in which the clamping plate includes an annular detent comprising the annular engagement surface and defining the workpiece-mounting surface hole.

4. A rotary workpiece indexing apparatus as defined in claim 1 in which the clamp bolt cam linkages are configured to move the bolts in respective directions having axially directed components.

5. A rotary workpiece indexing apparatus as defined in claim 1 in which the clamp bolt cam linkages are configured to use lost motion to provide the same shuttle stroke regardless of the available piston stroke length of cylinders selected to drive clamping and/or unclamping.

6. A rotary workpiece indexing apparatus as defined in claim 1 in which:
    the hydraulic cylinder is carried by the housing and includes a piston supported for generally horizontal reciprocal translational motion along a piston stroke path between an unclamped position releasing the spindle for rotation and a clamped position clamping the spindle to the housing;
    each clamp bolt cam linkage includes a shuttle supported for generally vertical reciprocal translational motion along a shuttle path and carrying one of the clamp bolts; and
    each clamp bolt cam linkage is configured to convert generally horizontal piston forces into generally vertical forces transmitted through the shuttle and clamp bolt.

7. A rotary workpiece indexing apparatus as defined in claim 6 in which the clamps are biased toward their respective clamping positions and are movable toward their respective unclamped positions by hydraulic cylinder actuation.

8. A rotary workpiece indexing apparatus as defined in claim 6 in which the clamps are biased toward their respective unclamped positions and are movable toward and held in their respective clamping positions by hydraulic cylinder actuation.

9. A rotary workpiece indexing apparatus as defined in claim 6 in which:
    the clamp linkage includes an arm pivotally engaged with the piston for relative pivotal motion about a first pivot axis and pivotally engaged with the shuttle for relative pivotal motion about a second pivot axis spaced from the first pivot axis with the linkage in the clamped position, and configured to convert generally horizontal motion of the piston into generally vertical motion of the shuttle and clamp bolt; and
    the angle between the shuttle/clamping plate stroke path and an imaginary line drawn through the first and second pivot axes is less than 14 degrees with the linkage in the clamped position.

10. A rotary workpiece indexing apparatus as defined in claim 9 in which the angle between the shuttle/clamping plate stroke path and an imaginary line drawn through the first and second pivot axes is approximately 13 degrees with the linkage in the clamped position.

11. A rotary workpiece indexing apparatus as defined in claim 1 in which the upper engagement surface of the spindle is disposed at a radially outermost peripheral circumferential outer edge of the spindle.

12. A rotary workpiece indexing apparatus as defined in claim 11 in which:
    the spindle includes a radially outwardly extending circumferential spindle flange disposed at the radially outermost peripheral circumferential outer edge of the spindle; and
    the upper and lower annular engagement surfaces of the spindle are disposed on respective upper and lower surfaces of the spindle flange.

13. A rotary workpiece indexing apparatus as defined in claim 12 in which the spindle flange is integrally formed with the rest of the spindle as a single unitary piece.

14. A rotary workpiece indexing apparatus as defined in claim 12 in which the spindle flange includes a radially outermost circumference of the spindle.

15. A rotary workpiece indexing apparatus as defined in claim 12 in which the spindle has a major diameter of less than 30.5 cm.

16. A rotary workpiece indexing apparatus as defined in claim 1 in which the apparatus includes a rotary digital encoder carried by the spindle and configured to measure rotary motion of the spindle relative to the housing.

17. A rotary workpiece indexing apparatus as defined in claim 1 in which:
the spindle includes a lower annular engagement surface coaxially aligned with an annular engagement surface of the housing; and
the apparatus includes an annular clamp ring disposed between the lower annular engagement surface of the spindle and the engagement surface of the housing.

18. A rotary workpiece indexing apparatus as defined in claim 1 in which the clamping plate is in sealing contact with a circumferential sealing surface of the spindle.

19. A rotary workpiece indexing apparatus as defined in claim 1 in which the apparatus includes an indexing motor carried by the housing, drivingly connected to the spindle, and configured to drive the spindle in indexed rotation relative to the housing.

20. A rotary workpiece indexing apparatus for rotationally indexing a workpiece for machining operations, the apparatus comprising:
a spindle supported on a housing for rotation about a spindle axis and including a workpiece-mounting surface coaxially disposed at one axial end of the spindle;
a spindle lock configured to releasably secure the spindle against rotational motion relative to the housing, the spindle lock including clamps carried by the housing in circumferentially-spaced locations around the spindle and configured to be driven to respective clamped positions securing the spindle against rotational motion by clamping the spindle to the housing through the application of clamping forces at respective spaced-apart locations around the spindle;
a clamping plate comprising an annular engagement surface, the clamping plate being carried by the housing for axial movement along a clamping stroke between a clamped position with the engagement surface of the clamping plate applying clamping pressure to an annular upper engagement surface of the spindle and an unclamped position releasing clamping pressure from the spindle, the clamping plate being in sealing contact with a circumferential sealing surface of the spindle, the spindle lock clamps being connected to the clamping plate and configured to clamp the spindle against the housing by applying force through the engagement surface of the clamping plate to the upper engagement surface of the spindle; and
a first o-ring seal disposed between the circumferential sealing surface of the spindle and a circumferential surface of a workpiece-mounting access hole of the clamping plate.

21. A rotary workpiece indexing apparatus as defined in claim 20 in which the clamping plate is in sealing contact with the housing.

22. A rotary workpiece indexing apparatus for rotationally indexing a workpiece for machining operations, the apparatus comprising:
a spindle supported on a housing for rotation about a spindle axis and including a workpiece-mounting surface coaxially disposed at one axial end of the spindle;
a spindle lock configured to releasably secure the spindle against rotational motion relative to the housing, the spindle lock including clamps carried by the housing in circumferentially-spaced locations around the spindle and configured to be driven to respective clamped positions securing the spindle against rotational motion by clamping the spindle to the housing through the application of clamping forces at respective spaced-apart locations around the spindle;
a clamping plate comprising an annular engagement surface, the clamping plate being carried by the housing for axial movement along a clamping stroke between a clamped position with the engagement surface of the clamping plate applying clamping pressure to an annular upper engagement surface of the spindle and an unclamped position releasing clamping pressure from the spindle, the clamping plate being in sealing contact with a circumferential sealing surface of the spindle, the spindle lock clamps being connected to the clamping plate and configured to clamp the spindle against the housing by applying force through the engagement surface of the clamping plate to the upper engagement surface of the spindle; and
an o-ring seal disposed between the clamping plate and the housing.

23. A rotary workpiece indexing apparatus as defined in claim 22 in which the clamping stroke is small enough to fall within the compression range of the o-ring such that sealing contact is maintained between the clamping plate and the housing throughout the clamping stroke.

24. A rotary workpiece indexing apparatus as defined in claim 23 further including positive stops in respective positions on the housing to engage the spindle lock clamps and positively stop the motion of the clamps with the clamping plate at a distance from its clamped position equal to the clamping stroke.

25. A rotary workpiece indexing apparatus as defined in claim 22 in which the clamping plate is biased away from the spindle.

26. A rotary workpiece indexing apparatus as defined in claim 25 in which the clamping plate is spring-loaded toward the unclamped position.

* * * * *